Figure 1:
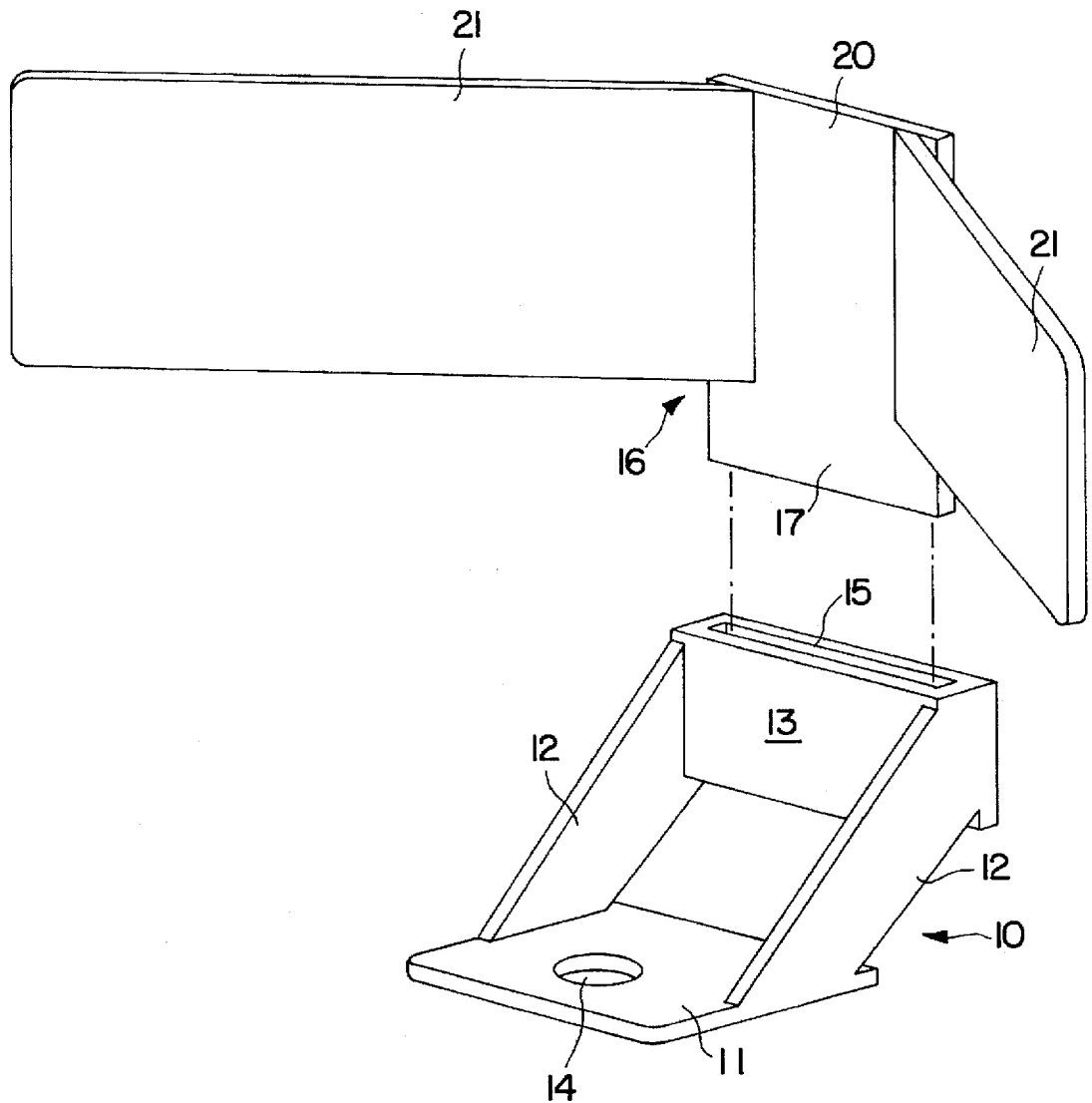

United States Patent [19]

Thompson et al.

[11] Patent Number: 5,697,630
[45] Date of Patent: Dec. 16, 1997

[54] HITCHING-APPARATUS

[75] Inventors: Colin Gregory Thompson; Roland Francis Thompson, both of Toowoomba, Australia

[73] Assignee: Austvent Pty. Ltd., Toowoomba, Australia

[21] Appl. No.: 525,597

[22] PCT Filed: Mar. 3, 1994

[86] PCT No.: PCT/AU94/00096

§ 371 Date: Nov. 17, 1995

§ 102(e) Date: Nov. 17, 1995

[87] PCT Pub. No.: WO94/20318

PCT Pub. Date: Sep. 15, 1994

[30] Foreign Application Priority Data

Mar. 3, 1993 [AU] Australia ............... PL7611

[51] Int. Cl.⁶ .............................................. B60D 1/36
[52] U.S. Cl. .............................................. 280/477
[58] Field of Search ............... 280/477, 478.1, 280/507, 504, 511

[56] References Cited

U.S. PATENT DOCUMENTS

| 3,773,356 | 11/1973 | Eichels et al. | 280/477 |
| 3,879,062 | 4/1975 | Miller | 280/477 |
| 4,840,392 | 6/1989 | Baskett | 280/477 |
| 4,871,185 | 10/1989 | Chakroff et al. | 280/477 |
| 4,974,866 | 12/1990 | Morgan | 280/477 |
| 5,330,196 | 7/1994 | Ricles | 280/477 |
| 5,529,330 | 6/1996 | Roman | 280/477 |
| 5,549,316 | 8/1996 | Jones | 280/477 |

FOREIGN PATENT DOCUMENTS 2250966  6/1992  United Kingdom.

Primary Examiner—Kevin Hurley
Attorney, Agent, or Firm—Dvorak & Orum

[57] ABSTRACT

There is provided hitching apparatus including a mounting means (10) including a base plate portion (11) supporting integrally formed struts (12) to which is fabricated an upper mounting socket (13). The base plate portion (11) is secured to the goose-neck of a vehicle by means of the threaded stud and nut of a conventional tow ball. The mounting socket (13) is adapted to receive the tongue portion (17) of a guide assembly including a pair of guide plates (21) which in use diverge from their mounting portion (20) to extend rearward and outward of the tow-ball. Reversing the vehicle to the hitch of the trailer with the hitching assembly installed results in either the hitch directly contacting the mounting portion (20) or engagement of the hitching portion with either of the guide plates (21) whereupon the hitching portion is guided to the mounting portion (20).

6 Claims, 2 Drawing Sheets

HITCHING-APPARATUS

This invention relates to a hitching apparatus.

This invention has particular but not exclusive application to hitching apparatus for use with a conventional ball-type hitch and for illustrative purposes reference will be made to such application. However, it is to be understood that this invention could be used in other applications, such as with hitches other than ball-type hitches.

Whilst self-aligning hitches in general are known, such hitches generally require the provision of a specialized hitch arrangement, such as the self-aligning hitches used on military vehicles and self-aligning couplings for coupling semi-trailers to prime movers. There have been attempts to provide self aligning hitching apparatus for conventional ball-type coupling which will permit a vehicle operator to align for engagement apparatus to be towed such as a trailer, boat-trailer or the like, from the towing vehicle cabin, and to also thereby prevent low speed but damaging impacts between the vehicle and the hitching means of the vehicle to be trailed.

However, this apparatus breaches the requirement of most road laws that the license or registration number plate of the vehicle be visible at all times when driving. In most domestic vehicles the license or registration number plate is located in the region of the tow ball of vehicles equipped with such. Additionally, passive guidance hitching apparatus as proposed, comprising as it does a pair of guidance wings disposed about the vehicle hitch means and adapted to guide the complementary hitching means of the trailer or the like, by its very nature restricts the relative angle developed between the respective vehicles to the included angle between the wings, which is minimised to provide for adequate centering force in the hitching operation.

The present invention aims to substantially alleviate the above disadvantages and to provide hitching apparatus which will be reliable and efficient in use. Other objects and advantages of this invention will hereinafter become apparent.

With the foregoing and other objects in view, this invention in one aspect resides broadly in hitching apparatus adapted for engagement with hitching means on a vehicle to be towed and including vehicle hitch means and guide means displaceable by hand from an operable configuration wherein said hitching means may be guided to a position adjacent said hitch means and a stowed configuration.

In the context hereinafter, the expression "displaceable by hand" is to be taken to include hand operable apparatus which may be operated by the user without tools, but includes also apparatus which although operable without tools may also be amenable to operation if desired with tools.

Preferably, the vehicle hitch means supported on the vehicle comprises a ball hitch of the type representing the majority of domestic and light commercial hitching arrangements. Such apparatus generally comprises a machined or cast hitching ball having a threaded stud and a bearing flange. The threaded stud is adapted to pass through a drilling through a gooseneck rigidly supported on the vehicle until the bearing flange seats thereto whereupon the ball may be secured thereto by a nut and spring washer. The gooseneck is generally associated with a substantial tow bar frame member bolted securely to the vehicle structure.

The corresponding hitching means generally takes the form of a cast or forged socket arrangement having a spring loaded or threaded locking means within the socket such that when the locking means is disengaged the ball may pass into the socket. The locking means may then be engaged by means of a knurled handle acting on a threaded rod, or by the return action of the spring respectively, the ball being restrained within the socket but able to pivot relative thereto in the manner of a ball joint.

The guide means may take any form consistent with the function of providing a means of guiding the hitching means to a location adjacent the vehicle hitch means whereby the hitching elements may be mutually engaged. Preferably, the guide means comprises passive guide means selected to be operable in response to the vehicle operator reversing the vehicle to a position wherein the hitching means of the trailer is at least approximately adjacent the vehicle hitch means, and whereby the hitching means is stopped at or guided to a position adjacent the vehicle hitch means as the case may be. Alternatively, the guide means may comprise active guide means which may be operable to acquire and guide the hitching means to the vehicle hitch means while the vehicle is moving or stationary relative to the trailer or the like.

For example, passive guide means may comprise a guide portion disposed outward of the vehicle centerline from a stop portion located adjacent to the vehicle hitch means and adapted to stop the guided hitching means substantially over the vehicle hitch means. Preferably, the guide portion diverges from and is formed integrally with the stop portion and extends to a point sufficiently wide of the vehicle centerline to be engaged by the hitch means under reversing of the vehicle by a driver of reasonable competence having regard for the loss of visibility of the hitch means in the critical last few feet.

Preferably, the guide portion is of its maximum transverse extension from the centerline at its outer end. Preferably, the guide portion extends sufficiently to the rear of the tow-ball to provide for contact with the hitch means at a separation of the vehicle and the trailer or the like sufficient to provide a practical scope for alignment.

For example, the guide portion may include a pair of straight, curved or other suitably shaped, relatively rigid arms adapted to be disposed substantially symmetric about the vehicle centerline and having a guide surface extending rearward and outward from the stop portion supported adjacent the vehicle hitch means. The guide means may for example comprise a stop portion having formed thereon a pair of guide portions having a planar guide surface adapted to diverge rearward of the stop portion. Preferably, the available aligning force is a compromise result balancing the rearward extent of the apparatus to obtain a reasonable spread of the apparatus whilst keeping the size of the apparatus down. In this context, it is preferred that the arms diverge from the stop portion at an angle of approximately 45° and accordingly have an included angle one to the other of approximately 90°.

The means providing for the guide means to be displaceable by hand from an operable configuration wherein the hitching means may be guided to a position adjacent said hitch means and a stowed configuration may take any suitable form. For example, the apparatus may include a hitching assembly bearing the vehicle hitch means and the guide means and mounted to a gooseneck extension of the tow bar of the vehicle by mounting means permitting removal of the hitching assembly which may then be stowed in the vehicle.

Alternatively, the mounting means may be selected to retain the hitching assembly on the gooseneck extension for movement between an operable position and a position where the license or number plate is not obscured and the hitching assembly does not limit the relative angular displacement of the towed and towing vehicles. For example, the hitching assembly may be pivotally mounted to the gooseneck extension by a transverse pivot arrangement whereby the hitching assembly may be selectively moved between an operable position and a lower stowed or travelling position, and be provided with hand operable retaining means adapted to selectively retain the hitching assembly in the respective positions. The hand operable retaining means may for example comprise complementary portions of the gooseneck extension and the hitching assembly bearing cooperable drillings therethrough through which may be engaged a pin or the like adapted to be removed and inserted by hand.

However, it is preferred that the apparatus be selected to be able to be fitted to existing hitching arrangements for domestic vehicles. Accordingly, in another aspect, this invention resides broadly in hitching apparatus including:

mounting means secured to a vehicle adjacent a vehicle hitch means thereof, and guide means supported by said mounting means and displaceable by hand from an operable configuration wherein said hitching means may be guided to a position adjacent said hitch means and a stowed configuration.

The mounting means may be formed integrally with or fitted to the gooseneck of the tow-bar. For example, the mounting means may comprise an integral upstanding portion of the goose-neck and may be welded thereto. Alternatively, the mounting means may comprise a plate-like member adapted to be secured to the goose-neck by means of retention beneath the flange of the tow ball. For example, the mounting means may include a plate-like portion having an aperture therein adapted to index with the aperture in the goose-neck whereupon the tow-ball may pass through both and be secured by a nut or the like.

The plate-like member may include location means to prevent rotation of the mounting means in use or during the installation procedure. Examples of such location means may include a keyway or the like adapted to be engaged by a key provided on the threaded stud, the goose-neck being provided with a similar keyway such that the goose-neck, plate-like member and stud may be positively keyed in the correct orientation.

Alternatively, the plate-like member may be provided with one or more downward depending flange portions adapted to pass over one or both of the lateral edges of the goose-neck and thereby similarly lock the plate-like member against rotation. If desired, other binding means may be provided, such as provision of a textured surface on the contact face of the plate-like member With the gooseneck, locating pins or other protrusions such as may be provided by weld spots or the like.

Preferably, the mounting means and the guide means are mutually configured such that the preferred mounting means may be effectively permanently mounted to the tow ball and gooseneck assembly, and the guide means be readily displaced therefrom between its operable and stowed positions by hand. The means providing for displaceability of the respective parts may provide for separability of the respective parts or retention of the parts for movement between an operable position and a position where the license or number plate is not obscured and the guide means does not limit the relative angular displacement of the towed and towing vehicles. For example, the mounting means and the guide means may include interconnecting means including a pivot or the like providing for the guide assembly to be folded rearward and downward of the vehicle hitch means and further be provided with locking means such as a hand operable locking pin or the like adapted to retain the respective parts in at least the operable position.

In the interests of simplicity and to also provide for the provision of universal mounting means for bicycle racks or the like it is preferred that the guide means be demountable from the mounting means.

Accordingly, in a further aspect this invention resides broadly in hitching apparatus including:

a mounting means securable to a vehicle adjacent a hitch means thereof;

guide means adapted to engage a hitching means of a trailer for guidance of the hitching means to a position adjacent said vehicle hitch means, and releasable connection means whereby said guide means may be selectively mounted and dismounted from said mounting means by hand.

The releasable connecting means may take any suitable form consistent with the function of providing for the ready removal of the guide means from the mounting means by hand. For example, the releasable connecting means may comprise complementary engagement portions provided on each of the mounting means and guide means, or may comprise clamp means adapted to clamp the guide means to the mounting means.

Preferably, the mounting means is provided with a mounting portion adapted to releasably engage a corresponding engagement portion of the guide means, the mounting and engagement portions being adapted to provide for interconnection which resists normal operating loads on the apparatus in use but which provides for ready disengagement when moved apart in a direction not encountered by the apparatus in normal use. By this means, the releasable connecting means avoid the requirement for moving parts such as clamping means.

For example, the provision of one or more complementary spigot and socket portions on the mounting means and guide means, selected to resist relative rotation about any axis and adapted to be separable by moving the guide means linearly, for example vertically, relative to the mounting means may provide suitable releasable interconnecting means. If desired, the security of the apparatus in use may be enhanced by provision of simple locking means such as a finger-pull locating pin adapted to pass transversely through the complementary spigot and socket in assembly. If desired, this drillings for receiving the finger-pull locating pin may also be adapted to receive a padlock or the like in the event that the guide means is to be secured in place against theft, or where some complementary ancillary equipment is to be so secured to the mounting means when the guide means is not in use.

The apparatus in accordance with the present invention provides for improvement to the methods of hitching a trailer in several ways. Where the apparatus is permanently mounted in its operable configuration, the vehicle operator may simply reverse the vehicle to the trailer hitching means until the trailer hitching means is heard or felt to either touch the stop means or be guided thereto as the case may be depending on the accuracy of the reversing process. Where the guide means is demountable, the vehicle operator may for example stop the vehicle and install the guide means prior to reversing the vehicle and hence the guide means into engagement with the hitching means of the trailer.

Figure 2:
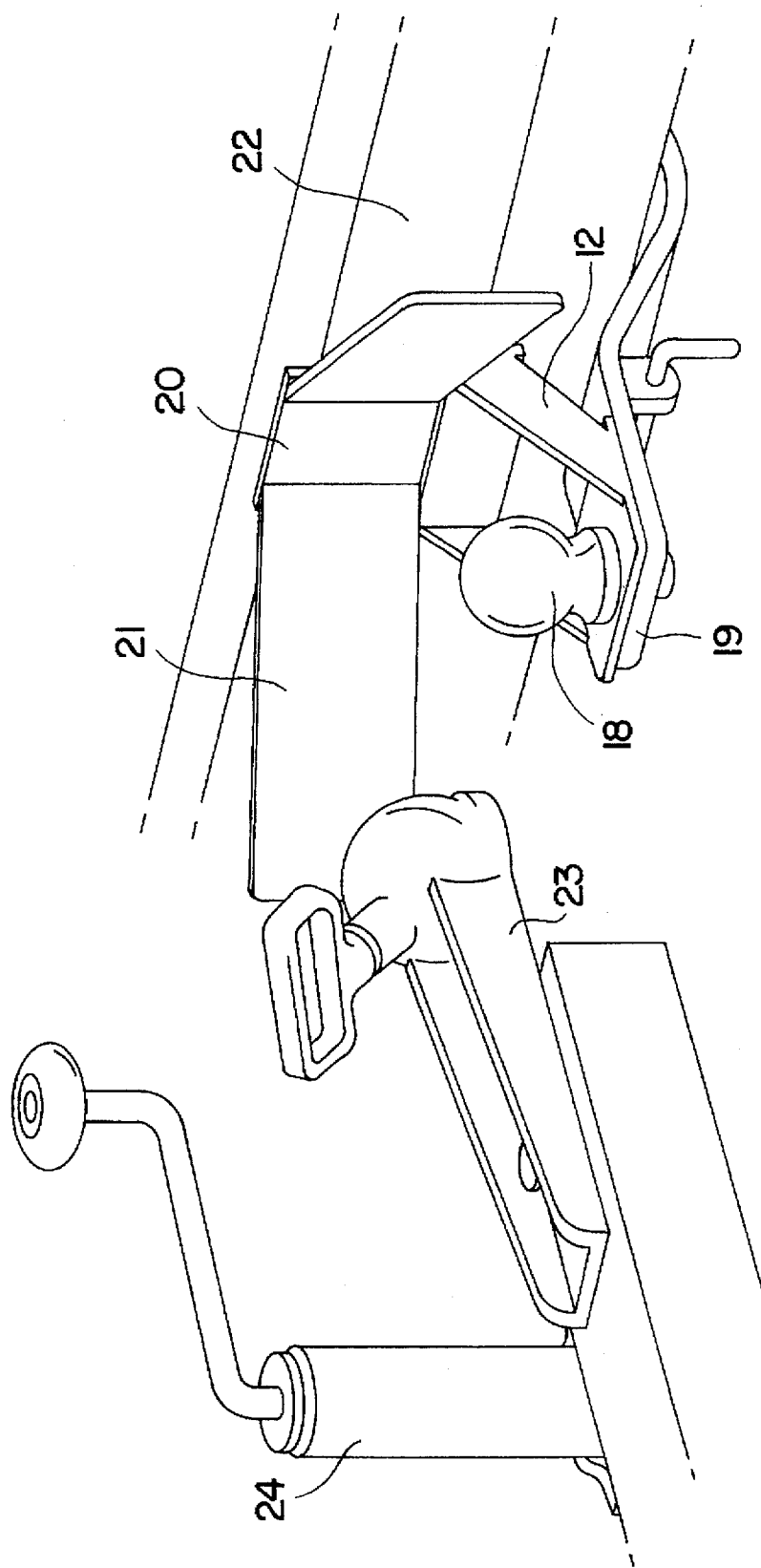

In order that this invention may be more readily understood and put into practical effect, reference will now be made to the accompanying drawing which illustrate a preferred embodiment of the invention, wherein:

FIG. 1 is an exploded perspective view of apparatus in accordance with the present invention, and FIG. 2 is a perspective view of apparatus in accordance with the present invention in assembly.

In the figures there is provided a mounting means 10 including a base plate portion 11 supporting integrally formed struts 12, the upper ends of which are interconnected with and supporting of a mounting socket 13. The base plate portion 11 is provided with an aperture 14 to permit securing of the mounting means 10 to the goose-neck 19 of a vehicle by means of a tow-ball 18.

The mounting socket 13 is provided with a slotted aperture 15 adapted to receive a corresponding tongue portion 17 of a guide assembly 16. The guide assembly 16 further comprises a stop portion 20 having integrally formed therewith a pair of guide plates 21. The guide plates 21 diverge from the stop portion 20 such that when the tongue portion 17 is engaged with the slotted aperture 15, the guide plates 21 extend to points rearward and outward of the tow-ball 18.

In use, the user reverses the vehicle 22 to a point close to the trailer hitch assembly 23, exits the vehicle and removes the guide assembly from a storage position, generally the vehicle boot or trunk. The user then fits the guide assembly 16 be insertion of the tongue portion 17 into the slotted aperture 15 and reverses towards the trailer hitch assembly 22 until the stop portion 20 is perceived to be in contact with the hitch assembly 22 of the trailer. This contact may occur as a result of the hitch assembly 22 directly contacting the stop portion 20 or may arise by engagement of the hitch assembly 22 with either of the guide plates 21 whereupon the hitching portion is guided therealong to the stop portion 20, the displacement of the hitch assembly 22 being facilitated by lateral movement of a jockey wheel assembly 24 or foot or the like supporting the hitch assembly 22 at a requisite hitching height.

If desired, the hitch assembly may be set at a height such that the hitch assembly 22 contacts and then rides over the tow-ball 18 to provide positive location thereon after being reversed or guided toward the stop portion 20. Apertures 25 may be provided to serve one or more of many functions such as providing for suspension of the guide assembly for painting, retention of the guide means by way of a lanyard or the like or, when disposed in pairs as illustrated, providing a means whereby access to the towball 18 may be barred.

Apparatus in accordance with the abovedescribed embodiment overcomes the stated disadvantages of the prior art and in addition the mounting means thereof provides a convenient mounting point for ancillary equipment such as a bicycle rack, an additional signal lamp assembly, towball use disabling means or the like.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

We claim:

1. A hitching apparatus comprising a base member configured to be mounted on the underside of a gooseneck of a conventional vehicle ball hitch assembly with the aid of the hitch ball mounting stud, and guide means comprising a pair of divergent guide portions symmetrically disposed about the hitch centerline and adapted to urge a towing hitch impinging thereon towards the hitch ball, and a stop portion truncating said guide portions and cooperating therewith to locate said towing hitch substantially over said hitch ball, said base member having integrally formed therewith a pair of struts, each of said struts interconnected at a respective upper end with a guide means mounting portion located forward of said hitch ball having a slot extending transversely of said centerline and adapted to receive a tongue, said tongue formed by downward extension of the stop portion of said guide means, whereby said guide means is removably mountable on said base member.

2. The hitching apparatus in accordance with claim 1, wherein said guide portion comprises a pair of substantially rigid arms disposed substantially symmetric about the vehicle centerline, each of said arms defined by a planar guide surface that extends rearwardly away from said stop portion and said vehicle and outwardly away from each other such that said plates form an included angle therebetween and do not extend beyond said ball hitch.

3. The hitching apparatus in accordance with claim 1, wherein said mounting means includes means for locating, said locating means for preventing rotation of the mounting means on the gooseneck.

4. The hitching apparatus according to claim 1, wherein said guide portions form an included angle of approximately 90°.

5. The hitching apparatus in accordance with claim 1, wherein said base portion is adapted to be a substantially permanent installation on the gooseneck.

6. A hitching apparatus for mounting onto a gooseneck of a conventional vehicle ball hitch assembly that is symmetrically mounted to a rear of a vehicle about a vehicle centerline, said vehicle ball hitch assembly of the type including a hitch ball having a threaded mounting stud that is threadingly received in said gooseneck, and a towing hitch that impinges upon said hitch ball, comprising:

a removable mounting means for attaching said apparatus to an underneath side of the gooseneck of the ball hitch assembly, said mounting means comprised of a base plate portion and a mounting socket integrally interconnected together through a pair of spaced struts, said base plate portion including an aperture for receiving said mounting stud to secure said mounting means to said underneath side of said gooseneck, each of said struts having an upper end connected to said mounting socket and a lower end connected to said base portion, said mounting socket located between said hitch ball and said vehicle when said mounting means is secured to said vehicle, said mounting socket including a transversely extending slot respective of said vehicle centerline, for removably receiving said stop portion tongue therein, said struts receiving said gooseneck therebetween when said mounting means is attached to said ball hitch assembly, said struts preventing said mounting means from rotational movement about said ball hitch assembly centerline;

a removable means for guiding comprised of a pair of divergent guide portions symmetrically disposed about the hitch centerline and adapted to urge the towing hitch towards the hitch ball, said guiding means further including a stop portion attached to and truncating said guide portions, said stop portion cooperating with said guide portions to locate said towing hitch substantially over said hitch ball, said stop portion including a downwardly depending tongue.

* * * * *